(12) United States Patent
Kramer et al.

(10) Patent No.: US 6,737,601 B1
(45) Date of Patent: May 18, 2004

(54) METHOD AND DEVICE FOR WELDING TOGETHER TWO BODIES

(75) Inventors: Gerardus Maria Kramer, Delft (NL); Maarten Willem Kastelein, Heemstede (NL)

(73) Assignee: Allseas Group S.A. (CH)

( * ) Notice: Subject to any disclaimer, the term of this patent is extended or adjusted under 35 U.S.C. 154(b) by 0 days.

(21) Appl. No.: 09/890,725

(22) PCT Filed: Feb. 4, 2000

(86) PCT No.: PCT/NL00/00072

§ 371 (c)(1),
(2), (4) Date: Dec. 3, 2001

(87) PCT Pub. No.: WO00/45986

PCT Pub. Date: Aug. 10, 2000

(30) Foreign Application Priority Data

Feb. 5, 1999 (NL) .............................................. 1011223

(51) Int. Cl.[7] .......................... B23K 9/028; B23K 9/12; B23K 37/02
(52) U.S. Cl. ................. 219/61; 219/125.11; 219/125.12
(58) Field of Search .............................. 219/61, 125.11, 219/125.12

(56) References Cited

U.S. PATENT DOCUMENTS

| 3,328,556 A | * | 6/1967 | Nelson et al. ........... 219/137 R |
| 3,617,690 A | * | 11/1971 | Ashiya et al. .......... 219/137 R |
| 3,800,116 A | * | 3/1974 | Tanaka et al. ............ 219/60 A |
| 3,922,517 A | | 11/1975 | Nelson et al. |
| 4,019,016 A | * | 4/1977 | Friedman et al. ....... 219/125.12 |
| 4,283,617 A | * | 8/1981 | Merrick et al. .......... 219/125.1 |
| 4,373,125 A | * | 2/1983 | Kazlauskas ................ 219/60 A |
| 4,806,735 A | * | 2/1989 | Ditschun et al. .......... 219/130.5 |
| 5,347,101 A | | 9/1994 | Brennan et al. |
| 6,429,405 B2 | * | 8/2002 | Belloni et al. ......... 219/124.34 |

FOREIGN PATENT DOCUMENTS

| JP | 55-84276 | * | 6/1980 | ............ B23K/9/12 |
| JP | 61-17364 | * | 1/1986 | ............ B23K/9/12 |
| JP | 9262667 | | 3/1996 | ........... B23K/9/028 |
| WO | 00/38872 | | 7/2000 | ........... B23K/9/028 |

* cited by examiner

Primary Examiner—Kiley Stoner
Assistant Examiner—Kevin P. Kerns
(74) Attorney, Agent, or Firm—Mark Zovko

(57) ABSTRACT

A method and apparatus for welding together two pipes or plates. The bodies to be welded are placed mutually in line against each other while leaving clear a weld groove. The weld groove is filled with more than one welding layer by a welding torch moved in a longitudinal direction of the weld groove, and wherein two welding layers are laid in one welding pass by two welding torches placed successively at a predetermined fixed distance in the longitudinal direction of the weld groove, so that a time-saving is achieved in the welding process.

9 Claims, 4 Drawing Sheets

METHOD AND DEVICE FOR WELDING TOGETHER TWO BODIES

BACKGROUND OF THE INVENTION

1. Field of the Invention

The present invention relates to a method for welding together two bodies, for instance pipes or plates, which are placed mutually in line against each other while leaving clear a weld groove, wherein the weld groove is filled with more than one welding layer by means of a welding torch moved in longitudinal direction of the weld groove. The present invention also relates to a device for welding together two bodies, for instance pipes or plates, which are placed mutually in line against each other while leaving clear a weld groove, comprising at least one carrier for a welding torch guidable in longitudinal direction of the weld groove.

2. Description of the Related Art

It is generally known to realize connections between two pipes, for instance to form a pipeline, or two plates by means of welding. Since the maximum thickness of a welding layer which can be deposited is limited and the pipes or plates are often too thick to be connected with a single welding layer, a welded connection is built up by laying several welding layers over each other until the weld groove is wholly filled. A method and device suitable for this purpose is known from the Netherlands patent application 9400742.

BRIEF SUMMARY OF THE INVENTION

The present invention has for its object to improve the above stated method and device.

The method according to the invention is characterized for this purpose in that two welding layers are laid in one welding pass by means of two welding torches placed successively on a carrier in the longitudinal direction of the weld groove. A time-saving is hereby obtained in the welding process. This is of particular importance in applications where the wielding time is of great economic influence, such as is the case in laying pipelines. Particularly in the use aboard a pipe laying vessel, a short welding time is important in achieving a high production in the number of welded connections per day with a limited number of welding devices. This is because the number of welding devices is limited by the dimensions of the ship.

If the weld groove has outward diverging walls, at least the trailing torch preferably performs an oscillating movement. A wider welding layer can hereby be laid by the trailing welding torch.

When the weld groove is filled with two welding layers in only one welding pass, oscillation of only the trailing welding torch can suffice. If on the other hand the weld groove is filled in several welding passes, both the leading and trailing welding torch are then oscillated. In this latter case the trailing welding torch is preferably oscillated at a greater amplitude than the leading welding torch, so that the width of the welding layer to be deposited per welding pass by each welding torch can be adjusted to the width of the weld groove.

In order in this case to enable complete filling of the weld groove with welding material, wore welding material can be added to the trailing welding torch, although the trailing welding torch can also be oscillated at a different, preferably higher, frequency than the leading welding torch. The field width of the two successive welding layers is separately controlled in that both the amplitude and the frequency of the oscillation movements of the two welding torches, can by individually adjusted and controlled. This provides the advantage that there are far fewer limitations in the choice of the form of the welding seam, and that the welding parameters for both torches an be optimally adjusted, whereby optimum savings are achieved in the welding time without great concessions having to be made in the weld quality (defects, mechanical properties).

In a preferred embodiment of the method for welding together two pipes, two carriers each having two welding torches are moved in peripheral direction of the pipes, thereby achieving a still further saving in the welding time.

The two carriers each having two welding torches can be displaced successively in the peripheral direction of the pipes, but in preference each carrier is moved per welding pass over half a peripheral part of the pipes.

Each carrier is then preferably moved per welding pass in downward peripheral direction of the pipes. When particular welding processes are used, such as MIG/MAG welding, downward welding can be performed at higher speed than upward welding. The total welding time in the connection of two pipes is therefore less if welding takes place in only downward direction and each carrier is returned to its starting position after each welding pass than if welding takes place downward and then upward.

The present invention likewise relates to a device for welding together two pipes or plates. The device according to the invention is characterized by two welding torches lying successively in the longitudinal direction of the weld groove. A significant advantage of this device is that it is compact and thereby suitable for welding together pipes of small diameter or plates of small size.

In this case the weld groove has outward diverging walls, the device according to the invention preferably comprises means for moving at least the trailing welding torch reciprocally in transverse direction the weld groove. These means can for instance be formed by a shaft pin driven for reciprocal sliding in the carrier and connected to the welding torch.

BRIEF DESCRIPTION OF THE DRAWINGS

The invention will be further elucidated hereinbelow with reference to the annexed drawings.

DETAILED DESCRIPTION OF THE INVENTION

Figure 1:
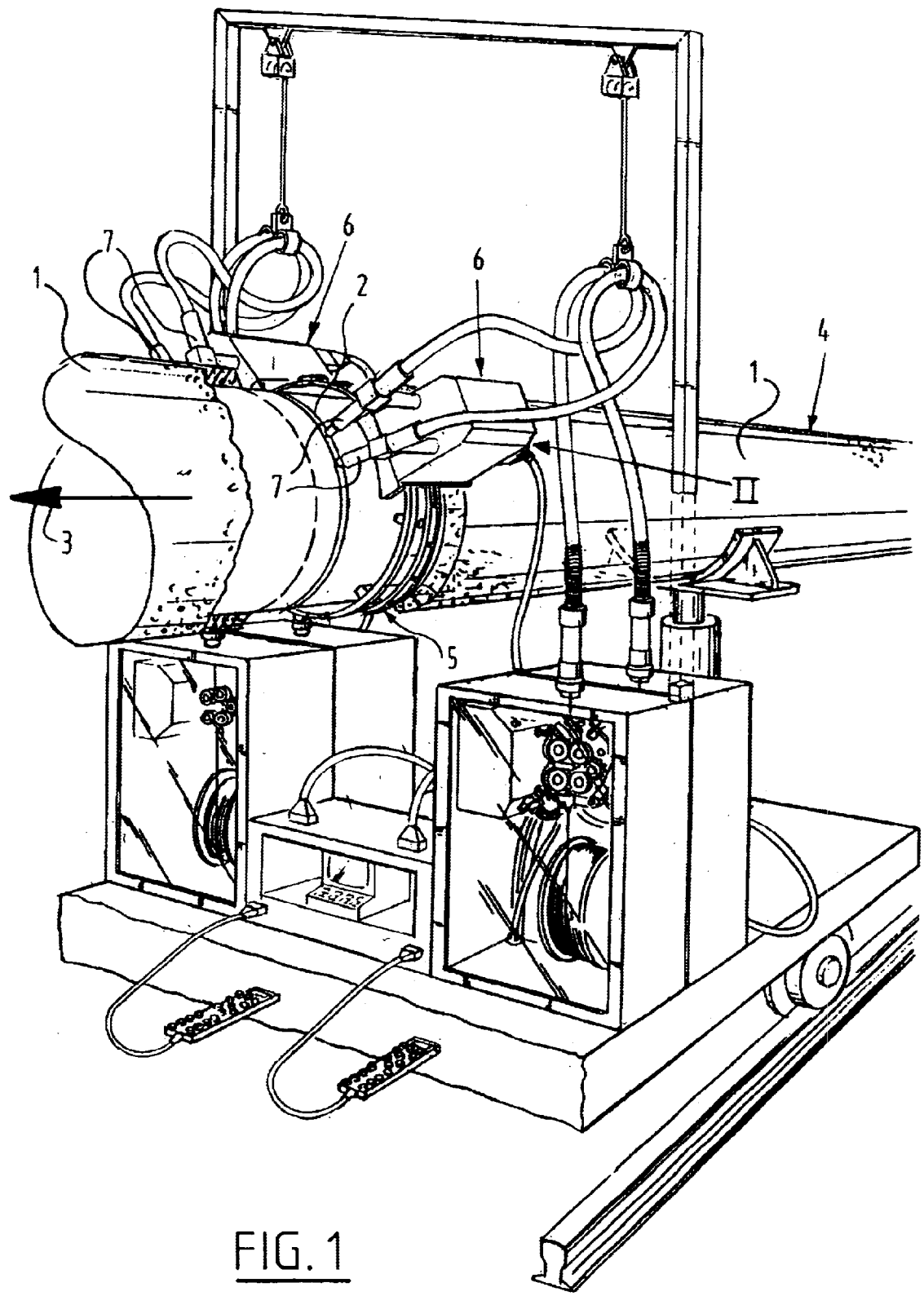
FIG. 1 shows a perspective view of a preferred embodiment of the device according to the invention.

FIG. 1 shows a device for welding together two pipes 1 which are placed coaxially against each other while leaving clear a weld groove 2. One or more of such welding devices can be placed on board a pipelaying vessel to lay welding layers in the annular weld grooves 2 of a pipeline 4 displaced in arrow direction 3. For an explanation of the components of the welding device shown in FIG. 1 and not significant for the present invention reference is made to the Netherlands patent application 9400742.

The welding device shown in FIG. 1 comprises a guide ring 5 arranged around one of the two pipes 1 and two carriers 6 for two welding torches 7 lying successively in the longitudinal direction of weld groove 2, which carriers can be guided by guide ring 5 in lengthwise direction of weld groove 2. According to a preferred embodiment of the method, each carrier 6 is moved per welding pass through half a peripheral part in downward peripheral direction of the pipes. The one carrier will thus fill the one half of the weld groove from top to bottom and the other carrier the other half. Each carrier herein provides two wielding layers from top to bottom per welding pass.

Figure 2:
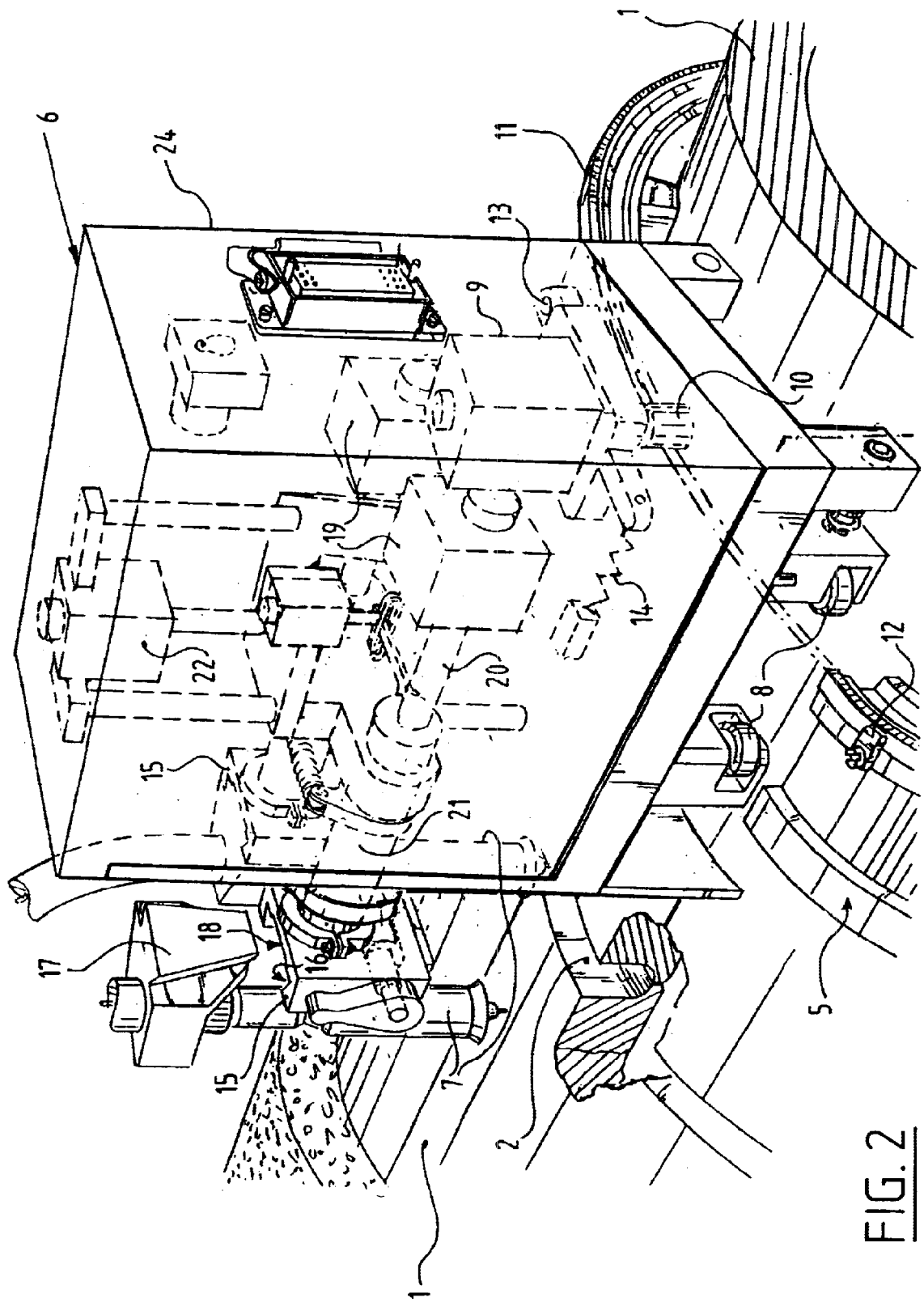
FIG. 2 shows on a larger scale a perspective view of detail II of FIG. 1.

FIG. 2 shows a perspective view of detail II of FIG. 1. On the underside of carrier 6 are situated guide wheels 8 for co-action with guide ring 5. Carrier 6 comprises a housing 24 in which is arranged a motor 9 which drives a geared drive pinion 10 which is in frictional contact with an engaging ring 11. This engaging ring 11 consisting of two halves is fixed to guide ring 5 by means of clamping pieces 12. Motor 9 is arranged pivotally on a shaft 13 on the housing 24 of the carrier. The drive pinion of motor 9 is held in contact with engaging ring 11 by means of a draw spring 14.

Arranged on the end face of housing 24 of carrier 6 are two torch holders 15 which each have a wedge-shaped cavity 16 for receiving a wedge 17 connected to welding torch 7. Welding torch 7 is arranged as according to arrow 18 in torch holder 15, whereafter the position drawn in dashed lines in FIG. 2 is obtained.

For reciprocal movement of welding torches 7 in transverse direction of longitudinal groove 2, an oscillating motor 19 for each welding torch 7 is provided in the housing of carrier 6. Each oscillating motor 19 drives a reciprocally slidable shaft pin 20, wherein each shaft pin 20 is guided slidably in a cylinder 21.

A lifting motor 22 is further arranged in housing 24 of carrier 6. Lifting motor 22 serves to adjust torch holders 15, and thereby also welding torches 7, in radial direction. An independent height adjustment can also be provided for welding torches 7 instead of a collective height adjustment.

Figure 3:
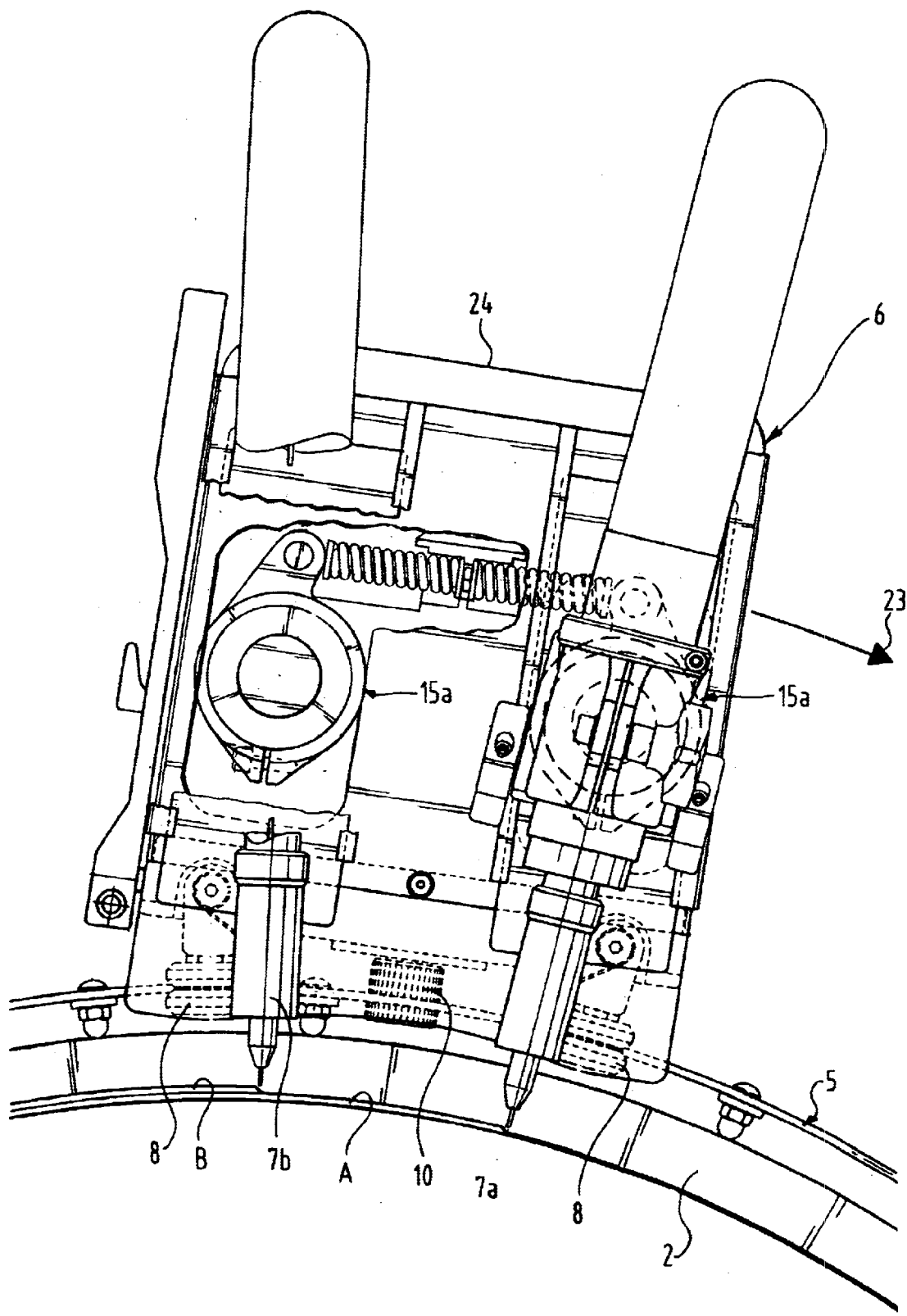
FIG. 3 shows a front view of a carrier according to another embodiment of the invention.

FIG. 3 shows a front view of a carrier according to another embodiment of the invention. Welding torches 7a, 7b are connected here to carrier 6 by means of clamping jaws 15a. In addition, there is provided a guide ring 5 which is held at a distance from the pipes and with which guide wheels 8 are in contact. No engaging ring 11 is therefore present. The two welding torches 7a, 7b placed successively in longitudinal direction of weld groove 2, indicated with arrow 23, lay two welding layers A, B in one welding pass. Because the trailing welding torch 7b lays welding, layer B over the welding layer A deposited by the leading welding torch 7a, the trailing welding torch 7b is placed higher in its clamping jaws 15a than welding torch 7a. Welding torches 7a, 7b are placed radially relative to pipes 1 so that they enclose a mutual angle.

Figure 4:
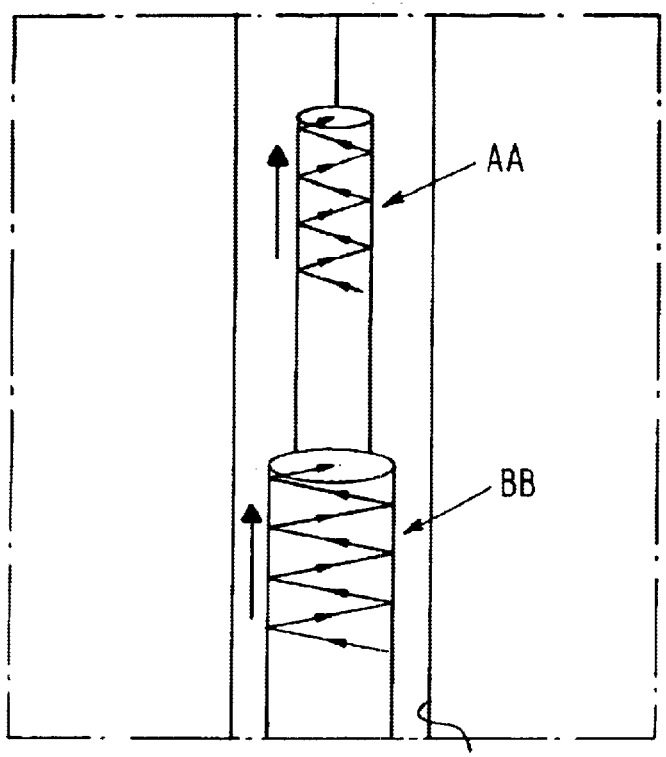
FIG. 4 is a schematic representation of a welding pass according to a preferred embodiment of the method according to the invention.
Figure 5:
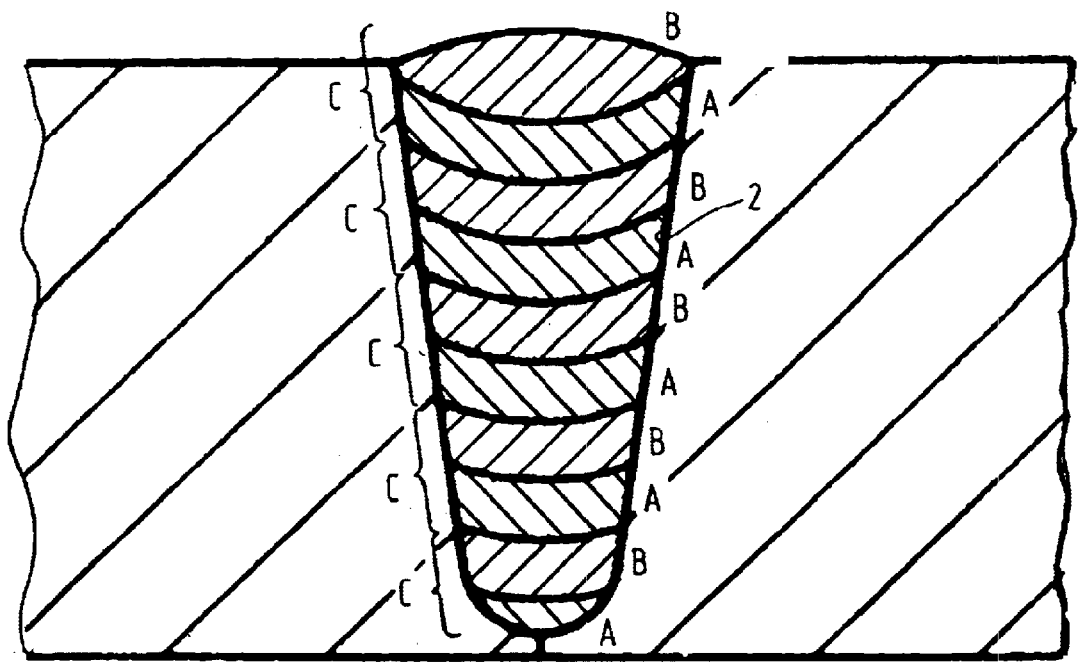
FIG. 5 shows a cross-section of a weld groove with outward diverging walls filled using the method and device according to the invention.

Using FIGS. 4 and 5 a preferred embodiment of the method according to the present invention will be elucidated. Arrow AA designates the welding movement of the leading welding torch 7a and arrow BB that of the trailing welding torch 7b. Both welding torches perform an oscillating movement, wherein the trailing welding torch 7b is oscillated at a greater amplitude and a higher frequency than the leading welding torch 7a. By means of this method a weld groove 2 is filled which has outward diverging walls. Since weld groove 2 widens towards the outside, the trailing welding torch 7b must in each welding pass deposit a wider welding layer than leading welding torch 7a, and is therefore oscillated at a greater amplitude than leading welding torch 7a. In addition, the trailing welding torch 7b is preferably oscillated at a higher frequency than leading welding torch 7a in order to enable filling of the wider weld groove 2 with the same quantity of material. The amplitude and frequency of the oscillation movement of each welding torch 7a, 7b is adapted per welding pass to the width of the weld groove 2 for filling.

FIG. 5 shows the final result of a V-shaped weld groove 2 filled in five welding passes C. Two welding layers A, B are laid at a time per welding pass C by two successively placed welding torches 7a, 7b.

If both downward and upward welding table place, at each turning point the leading welding torch becomes the trailing welding torch and the trailing welding torch becomes the leading welding torch. It is more advantageous however to only weld downward, wherein two carriers each having two welding torches are preferably moved over half a peripheral part of the pipes, because this can take place at greater speed than upward welding and a time-saving is achieved in the total welding process.

Means for moving at least the trailing welding torch reciprocally in transverse direction of the weld groove other than the shown and described oscillator motor 19 are possible, for instance a pivot arm.

The drawing Shows a welding device with two carriers, wherein each carrier is provided with two welding torches. The invention is however not limited hereto Four carriers can for instance also be applied, wherein each carrier covers a quarter peripheral part of the pipes. This can be advantageous in welding pipes with a large diameter. In addition, more than two welding torches can also be provided per carrier, wherein each welding torch can be oscillated independently with an axamplitude and frequency adapted to the width of the weld groove.

A connection between two pipes can also be welded with more than one welding device, as is usual on a pipe-laying vessel.

We claim:

1. Apparatus for welding together two pipes which are placed mutually in line against each other while leaving dear a weld groove, comprising a carrier for a welding torch guidable in a longitudinal direction of the weld groove, characterized by at least two carriers each having at least two welding torches lying successively in the longitudinal direction of the weld groove and wherein said welding torches lie adjacently side by side in the longitudinal direction of said weld groove.

2. Apparatus as claimed in claim 1, wherein said weld groove has outwardly diverging walls, and said two welding torches are comprised of a leading welding torch and a trailing welding torch characterized by means for moving at least each trailing welding torch reciprocally in a transverse direction relative to said weld groove.

3. Apparatus as claimed in claim 2, characterized in that said means are formed by a shaft pin driven for reciprocal sliding in each carrier and connected to at least said trailing welding torch.

4. Method for welding together two pipes which include
   placing the two pipes mutually in line against each other while leaving clear a weld groove formed in the two pipes;

placing two carriers each having two welding torches successively at a predetermined fixed distance in the longitudinal direction of said weld groove;

moving said two carriers each having two welding torches in a peripheral direction relative to the two bodies such that said weld groove is filled with two welding layers in one welding pass by means of the two welding torches of said two carriers, said welding torches adjacent to each other.

5. Method of claim 4, wherein said weld groove has outwardly diverging walls and each of said two carriers has a leading welding torch and a trailing welding torch, and at least said trailing welding torch of each of said carriers oscillates as said weld groove is filled.

6. Method as claimed in claim 5, wherein said trailing welding torch is oscillated at a greater amplitude than said leading welding torch.

7. Method as claimed in claim 6, wherein said trailing welding torch is oscillated at a frequency differing from that of said leading welding torch.

8. Method for welding together two pipes as claimed in claim 4, wherein each of said two carriers is moved over half a peripheral part of the said pipes per welding pass.

9. Method as claimed in claim 8, wherein each of said two carriers is moved in a downward peripheral direction of the pipes per welding pass.

\* \* \* \* \*